United States Patent [19]

Kain

[11] Patent Number: 5,685,604
[45] Date of Patent: Nov. 11, 1997

[54] CHILD-RESTRAINT BOOSTER SEAT

[75] Inventor: James M. Kain, Tipp City, Ohio

[73] Assignee: Cosco, Inc., Columbus, Ind.

[21] Appl. No.: 534,175

[22] Filed: Sep. 26, 1995

[51] Int. Cl.⁶ ........................................... A47C 1/08
[52] U.S. Cl. ...................... 297/256.15; 297/250.1; 297/488
[58] Field of Search .............. 297/256.15, 256.1, 297/250.1, 487, 488, 188.01, 188.12, 188.04, 188.2

[56] References Cited

U.S. PATENT DOCUMENTS

| | | |
|---|---|---|
| 185,555 | 12/1876 | Lindsay . |
| D. 283,855 | 5/1986 | Kujawski . |
| D. 291,032 | 7/1987 | Sauter et al. . |
| D. 297,287 | 8/1988 | Lopez . |
| D. 307,834 | 5/1990 | Sudoh et al. . |
| D. 315,253 | 3/1991 | Kain . |
| D. 324,611 | 3/1992 | Sedlack . |
| D. 330,639 | 11/1992 | Munro et al. . |
| D. 330,842 | 11/1992 | Meeker et al. . |
| D. 339,477 | 9/1993 | Kain . |
| 2,544,896 | 3/1951 | Nidetch et al. . |
| 2,759,529 | 8/1956 | Hagadorn . |
| 2,792,055 | 5/1957 | O'Neil . |
| 3,094,355 | 6/1963 | Pedro . |
| 3,563,600 | 2/1971 | Converse . |
| 4,164,357 | 8/1979 | Conachey .............. 297/250.1 X |
| 4,191,420 | 3/1980 | Fassett et al. . |
| 4,474,407 | 10/1984 | Nazar . |
| 4,521,052 | 6/1985 | Cone . |
| 4,527,830 | 7/1985 | Meyers . |
| 4,643,474 | 2/1987 | Wise et al. . |
| 4,671,574 | 6/1987 | Kassai . |
| 4,711,490 | 12/1987 | Brand . |
| 4,754,999 | 7/1988 | Kain . |
| 4,765,685 | 8/1988 | Sudoh et al. . |
| 4,834,420 | 5/1989 | Sankrithi et al. . |
| 4,951,997 | 8/1990 | Kenney . |
| 4,962,965 | 10/1990 | Glover . |
| 4,984,845 | 1/1991 | Knoedler et al. . |
| 5,061,012 | 10/1991 | Parker et al. . |
| 5,181,761 | 1/1993 | Meeker . |
| 5,183,311 | 2/1993 | Meeker et al. . |
| 5,213,393 | 5/1993 | Maurer et al. . |
| 5,230,523 | 7/1993 | Wilhelm . |
| 5,275,464 | 1/1994 | Eichhorn et al. . |
| 5,286,084 | 2/1994 | Bart . |
| 5,507,558 | 4/1996 | Kain .............. 297/256.15 |

FOREIGN PATENT DOCUMENTS

3313870A1  10/1984  Germany .

OTHER PUBLICATIONS

Fisher-Price Juvenile Products Catalog, 1992, p. No. 4.
Century Products Catalog, Nov. 1995, p. Nos. 15 and 16.
Gerry Products Catalog, Oct. 1994, p. Nos. 10 and 11.

*Primary Examiner*—Laurie K. Cranmer
*Attorney, Agent, or Firm*—Barnes & Thornburg

[57] ABSTRACT

A child-restraint booster seat includes a seat, a movable barrier shield, and a shield lock plate. The shield lock plate allows the user to selectively pivot the movable barrier shield for right-side access or left-side access to and from the child-restraint booster seat.

54 Claims, 5 Drawing Sheets

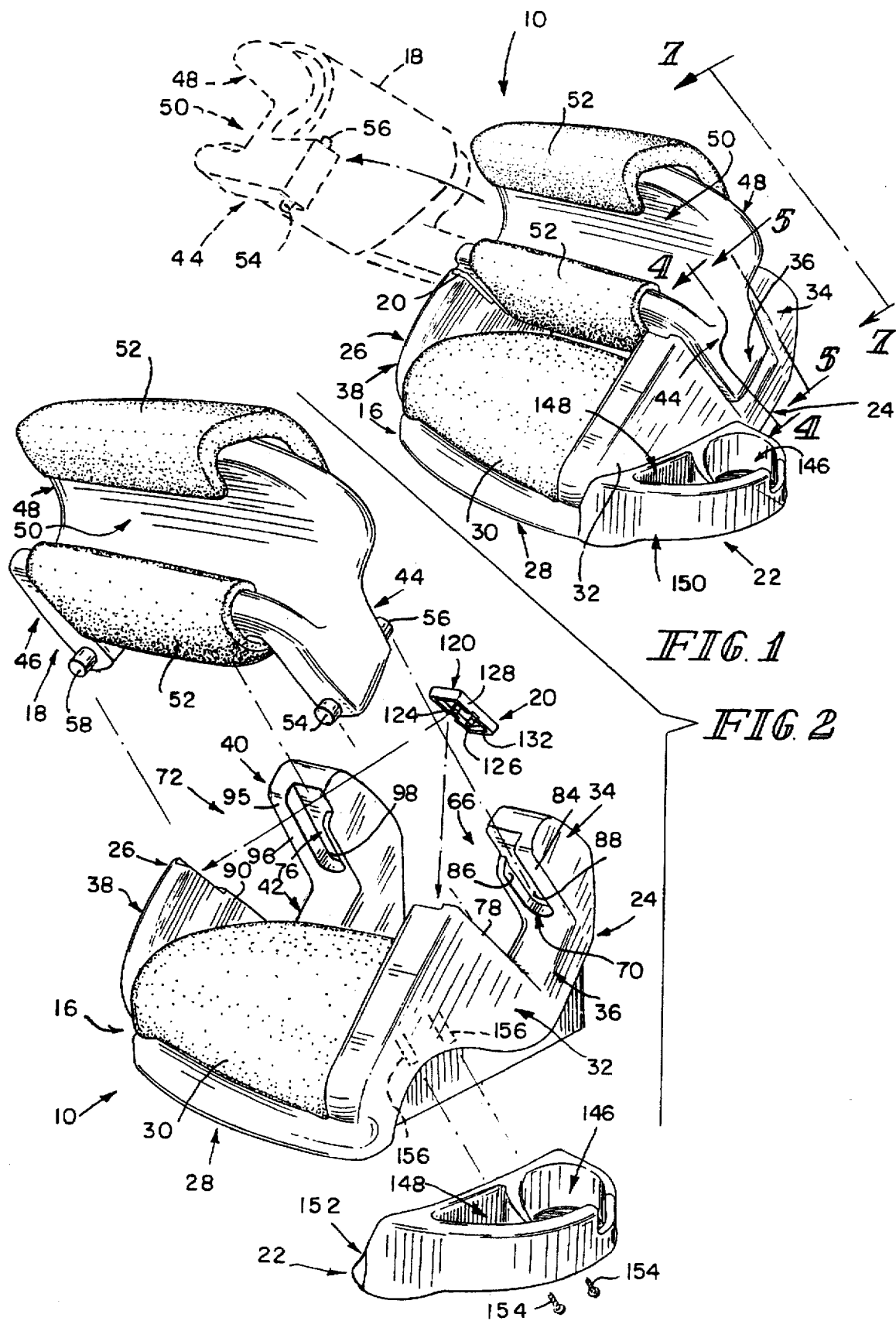

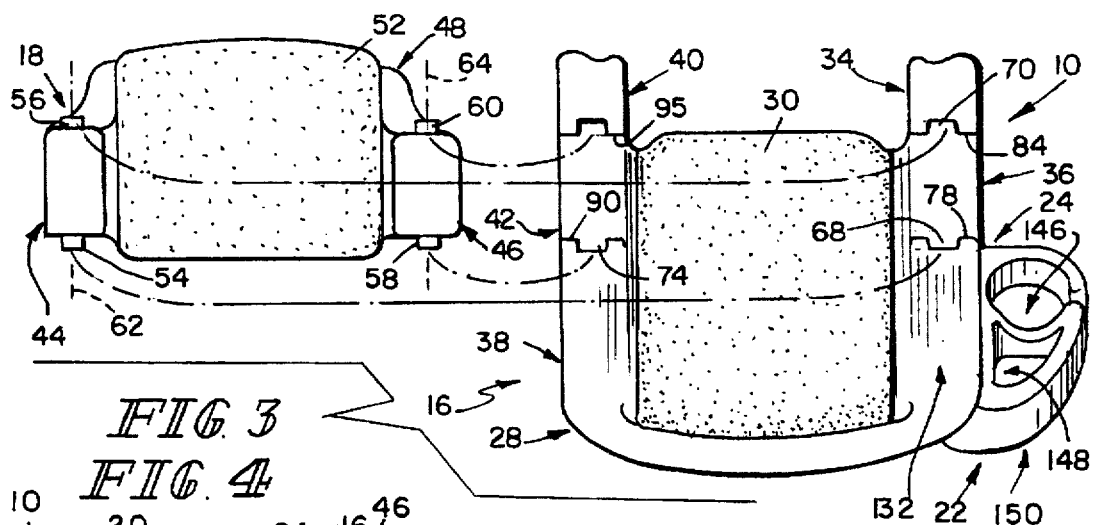
FIG. 3
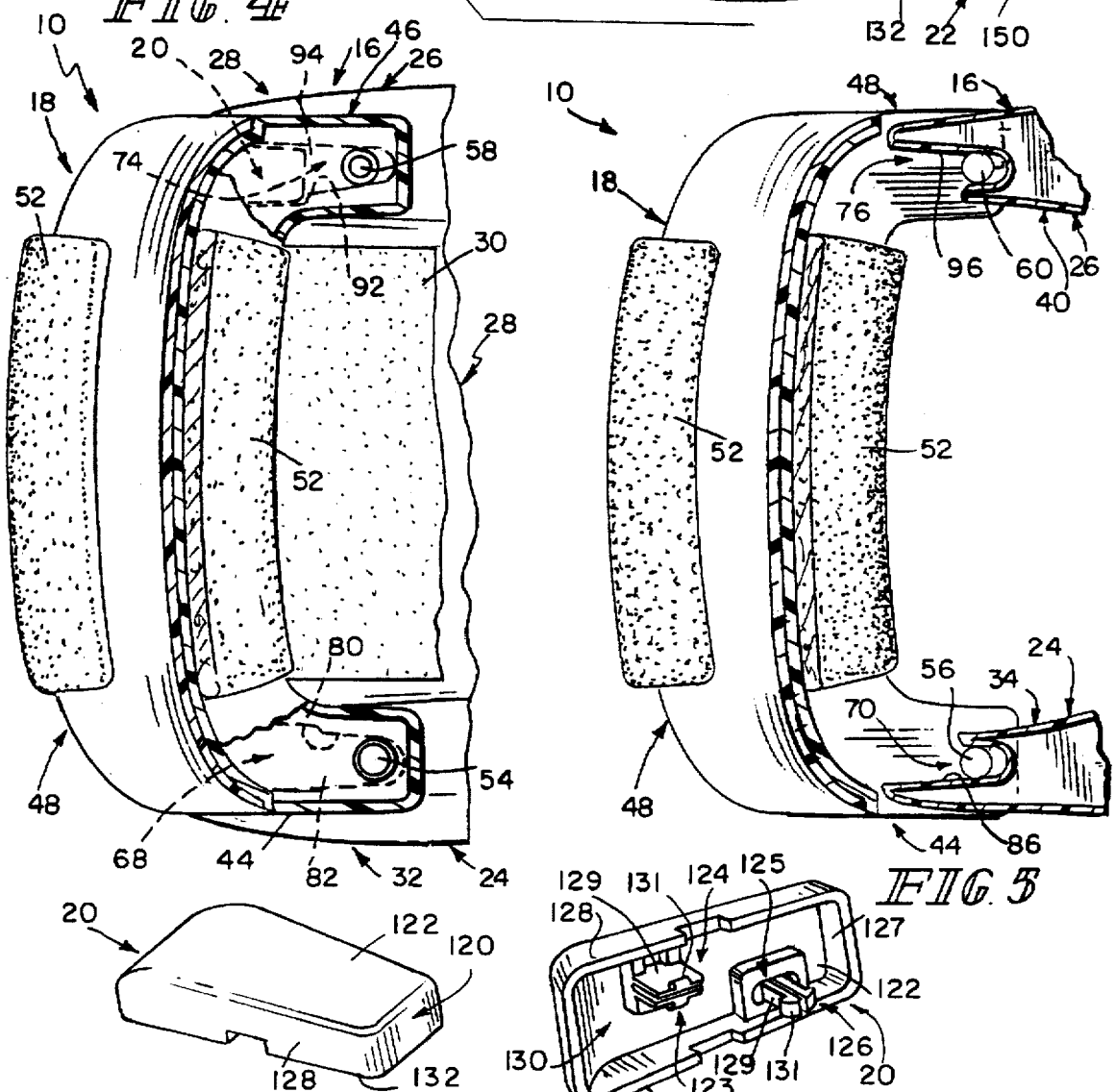
FIG. 4
FIG. 5
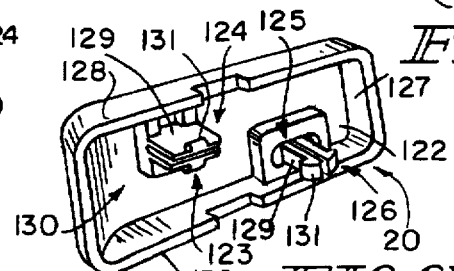
FIG. 6a
FIG. 6b

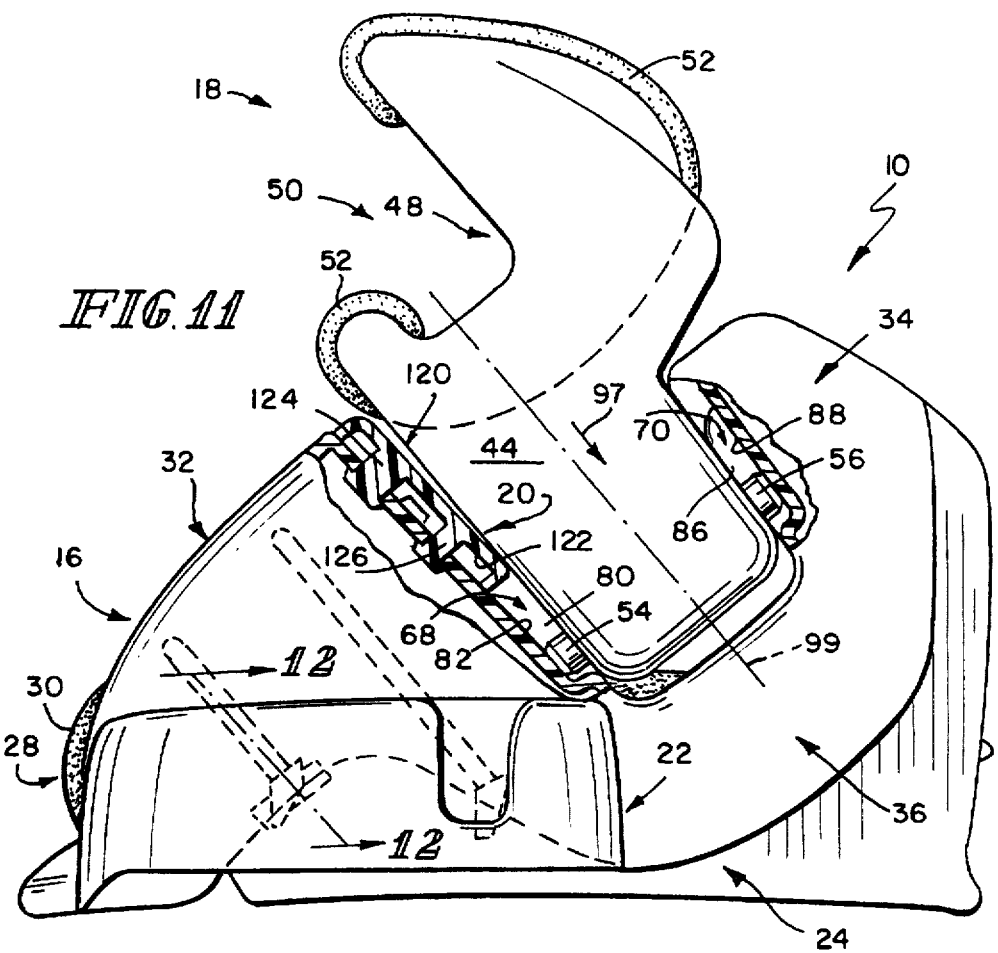

CHILD-RESTRAINT BOOSTER SEAT

BACKGROUND AND SUMMARY OF THE INVENTION

This present invention relates to a seat for children, and particularly to a child-restraint booster seat for use in a vehicle. More particularly, the present invention relates to a booster seat including a seat and a barrier shield mountable on the seat for movement between a child-receiving opened position and a child-retaining closed position.

Booster seats are often used in vehicles to provide seats for older children weighing, for example, 30 to 60 pounds (13.6 to 27.3 kg). Typically, a booster seat includes a seating surface for the child and a pivotable barrier shield movable relative to the seating surface to a position retaining the child in a seated position on the seating surface. Many barrier shields are formed to receive vehicle lap belts so that the lap belt can be used to retain the booster seat and its barrier shield in a selected position on an underlying regular vehicle seat. One well-known booster seat is the EXPLORER® brand seat made by Cosco, Inc. of Columbus, Ind. and disclosed, for example, in U.S. Pat. No. Des. 291,032. Booster seats are also disclosed, for example, in U.S. Pat. Nos. 5,275,464; 4,521,052; 4,754,999; 5,183,311; 4,643,474; 4,671,574; and 4,765,685; and in U.S. Pat. Nos. Des. 330,842; Des. 324,611; and Des. 307,834.

A booster seat having a side-pivot barrier shield would be welcomed by consumers. Also, a booster seat configured to hold cups or other articles for children seated in the booster seat would be convenient both for children and their caregivers.

According to the present invention, a booster seat is providing for seating a child in a selected place. The booster seat includes a seat and a movable shield configured for pivoting movement relative to the seat. The seat includes left and right side walls and a seat bottom positioned therebetween. Each side wall is formed to include a wing-receiving slot. The movable shield includes a left wing positioned to lie in the wing-receiving slot in the left side wall, a right wing positioned to lie in the wing-receiving slot in the right side wall, and a barrier between the left and right wings and above the seat bottom.

The movable shield further includes a pair of left pivot posts appended to the left wing and a pair of right pivot posts appended to the right wing. A left pair of opposing, spaced-apart, post-receiving slots are formed in the left side wall to receive the left pivot posts therein upon insertion of the left wing of the movable shield into the wing-receiving slot in the left side wall. A right pair of opposing, spaced-apart, post-receiving slots are formed in the right side wall to receive the right pivot posts therein upon insertion of the right wing of the movable shield in the wing-receiving slot in the right side wall.

In use, the movable shield can be pivoted about the left pivot posts on the left wing to swing the barrier away from the seat bottom and the right wing away from the right side wall to provide a child to be seated with "right-side access" to the seat bottom. Alternatively, the movable shield can be pivoted about the right pivot posts on the right wing to swing the barrier away from the seat bottom and the left wing away from the left side wall to provide a child to be seated with "left-side access" to the seat bottom. Such access options enhance the flexibility of a booster seat so that it can be mounted on either the left side or the right side of a regular vehicle seat without disadvantaging a caregiver placing a child in the booster seat.

In preferred embodiments, a shield lock plate is mounted to the seat to establish the swing direction of the movable shield. If, on the one hand, right-side access to the seat bottom is desired, then the shield lock plate is mounted to the left side wall adjacent to an open mouth of one of the left pair of opposing, spaced-apart, post-receiving slots to prevent a left pivot post from exiting its slot during pivotable movement of the movable shield about a pivot axis established by the two left pivot posts appended to the left wing. In this condition, pivoting movement of the movable shield moves the right wing and its pivot posts out of the wing-receiving slot in the right side wall.

If, on the other hand, left-side access to the seat bottom is desired, then the shield lock plate can be moved from a mounted position on the left side wall to a mounted position on the right side wall. In such a position, the shield lock plate now is mounted adjacent to an open mouth of one of the right pair of opposing, spaced-apart, post-receiving slots to prevent a right pivot post from exiting its slot during pivotable movement of the movable shield about a pivot axis established by the two right pivot posts appended to the right wing. Of course, in this condition, pivoting movement of the movable shield moves the left wing and its pivot posts out of the wing-receiving slot in the left side wall.

In other preferred embodiments, the booster seat further includes a cup holder mounted Go the seat along one of the left and right side walls. The cupholder includes a hidden-from-view mounting portion and a cup-receiving portion formed to include a first cavity configured to receive a cup and a second cavity configured to receive other articles.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is a perspective view of a booster seat according to the present invention showing a seating unit, a shield movable relative to the seating unit from a closed position (solid lines) to an opened position (phantom lines), and a cupholder attached to the seating unit;

FIG. 2 is an exploded assembly view of the booster seat of FIG. 1 showing the seating unit, the shield prior to insertion of left and right wings on the shield into slots formed in left and right side walls of the seating unit, a small shield lock plate that can be mounted on either a left or right side wall of the seating unit to control the pivot-opening direction of the shield relative to the seating unit, a cupholder, and connectors for attaching the cupholder to the left side wall of the seating unit;

FIG. 3 is a view showing how each of the pivot posts formed on the wings of the shield fit into post-receiving slots formed in the left and right side walls of the seating unit upon engagement of the shield and the seating unit;

FIG. 4 is a sectional view taken along line 4—4 of FIG. 1 showing lower pivot posts appended to the left and right shield wings lying in lower post-receiving slots formed in the left and right side walls of the seating unit and showing the position of the shield lock plate (in phantom) adjacent the mouth of the lower post-receiving slot formed in the right side wall to block exit of the lower right pivot post therefrom;

FIG. 5 is a sectional view taken along line 5—5 of FIG. 1 showing upper pivot posts appended to the left and right shield wings lying in upper post-receiving slots formed in the left and right side walls of the seating unit;

FIG. 6a is a perspective view of the top side of the shield lock plate of FIGS. 2 and 4;

FIG. 6b is a perspective view of the underside of the shield lock plate of FIG. 6a showing a rectangular mounting post and a circular mounting post;

FIG. 7 shows the shield lock plate mounted on the right side wall of the seating unit and the shield pivoted in a clockwise direction to disengage the left shield wing and the left side wall to provide "left-side access" to the seat;

FIG. 8 shows the shield lock plate mounted on the left side wall of the seating unit and the shield pivoted in a counter-clockwise direction to disengage the right shield wing and the right side wall to provide "right-side access" to the seat;

FIG. 11 is a left-side elevational view of the booster seat of FIG. 1, with portions broken away, showing coupling of the cupholder to the seating unit and showing the shield lock plate in a post-blocking position on the left side wall of the seating unit;

FIG. 12 is a view taken along line 12—12 of FIG. 11; and

FIG. 13 is a view taken along line 13—13 of FIG. 12.

DETAILED DESCRIPTION OF THE DRAWINGS

Figure 7:
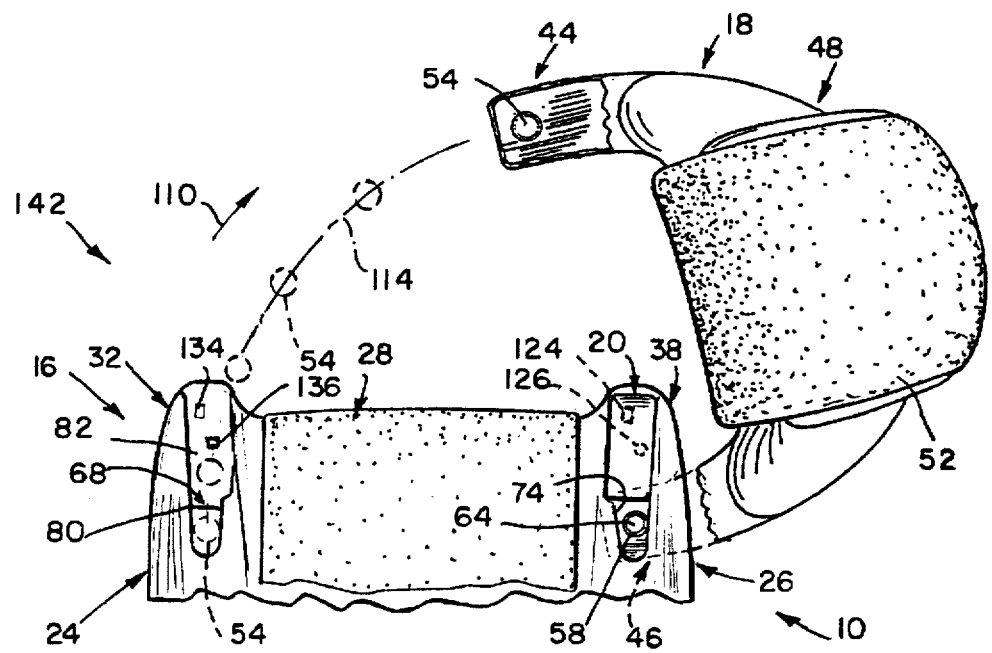
FIGS. 7 and 8 show how the shield lock plate can be moved from one side wall of the seating unit to another side wall of the seating unit to allow a user to pivot the shield in opposite directions relative to the seating unit.

A booster seat 10 for seating a child (not shown) in a selected place is shown in FIG. 1. Booster seat 10 is configured so that it can be held in place on a vehicle seat 12 using a vehicle lap belt 14 as shown, for example, in FIGS. 9 and 10, to retain both smaller children (FIG. 9) and larger children (FIG. 10) in a seated position.

Referring to FIGS. 1 and 2, booster seat 10 includes a seating unit 16, a movable shield 18 for engaging seating unit 16, and a shield lock plate 20 for mounting in selected places on seating unit 16 to control, govern, and limit movement of shield 18 relative to seating unit 16. A cupholder 22 is also mounted to seating unit 16 as shown in FIG. 1 to provide a convenient place for a caregiver or an occupant of booster seat 10 to store cups or other articles alongside seating unit 16. Cupholder 22 is a modular unit separate from seating unit 16 in the illustrated embodiment and means is disclosed herein for mounting cupholder 22 to seating unit 16 as shown, for example, in FIGS. 2 and 11-13.

As shown in FIGS. 1-3, seating unit 16 includes left side wall 24, right side wall 26, and a seat bottom 28 therebetween. A seat pad 30 is mounted on seat bottom 28 to comfort a child seated thereon. Left side wall 24 includes a left shield support 32 appended to seat bottom 28, a left arm rest 34, and an arm rest support 36 interconnecting left shield support 32 and left arm rest 34. Also, right side wall 26 includes a right shield support 38 appended to seat bottom 28 and arranged in spaced-apart relation to left shield support 32 to locate seat pad 30 therebetween. Right side wall 26 further includes right arm rest 40 and an arm rest support 42 interconnecting right shield support 38 and right arm rest 40. In a preferred embodiment, seating unit 16 is a one-piece injection-molded unit made of a plastics material such as polypropylene or polypropylene copolymer.

As shown in FIGS. 1-3, shield 18 includes a left wing 44, a right wing 46 arranged to lie in spaced-apart parallel relation to left wing 44, and an elongated barrier 48 positioned to interconnect forward ends of left and right wings 44, 46. Barrier 48 is formed to include a forwardly opening, horizontally extending channel 50 for receiving a vehicle lap belt 14 therein as shown, for example, in FIGS. 9 and 10. Thus, a vehicle lap belt can be used to hold booster seat 10 in a selected place on a vehicle seat. A barrier pad 52 is mounted on barrier 48 to comfort a child seated in seating unit 16.

A pair of left pivot posts 54, 56 is appended to left wing 44 on movable shield 18 and a pair of right pivot posts 58, 60 is appended to right wing 46 on movable shield 18 as shown, for example, in FIGS. 2-5. In the illustrated embodiment, these pivot posts 54, 56, 58, and 60 are integrally formed on movable shield 18. The two left pivot posts 54, 56 are arranged to share a common central axis 62 and the two right pivot posts 58, 60 are arranged to share a common central axis 64 that is arranged to lie in spaced-apart parallel relation to central axis 62 as shown best in FIG. 3. Lower left pivot post 54 extends away from left wing 44 along left central axis 62 in a first direction and upper pivot post 56 extends away from left wing 44 along left central axis 62 in a second direction opposite to the first direction. Lower right pivot post 58 extends away from right wing 46 along right central axis 64 in a third direction parallel to the first direction and upper right pivot post 60 extends away from right wing 46 along right central axis 64 in a fourth direction opposite to the third directing.

Shield 18 is configured to slidably and pivotably engage seating unit 16 in the manner shown in the drawings. Seating unit 16 is formed to include various slots for receiving left wing 44 and its pivot posts 54, 56 and right wing 46 and its pivot posts 58, 60 so that shield 18 is pivotable relative to seating unit 16 in the manner shown, for example, in FIGS. 1, 7, and 8. Shield 18 is pivotable relative to seating unit 16 to provide a child with easy left-side or right-side access to booster seat 10. In the illustrated embodiment, shield 18 is also slidable relative to seating unit 16 in the manner shown, for example, in FIGS. 9 and 10. Shield 18 is slidable relative to seating unit 16 to snugly accommodate children of varying sizes in booster seat 10 when the booster seat 10 is properly installed in an automobile seat.

Left side wall 24 of seating unit 16 is formed to include left wing-receiving slot 66 and a left pair of opposing, spaced-apart, post-receiving slots 68, 70. Right side wall 26 is formed to include right wing-receiving slot 72 and a right pair of opposing, spaced-apart, post-receiving slots 74, 76. These slots are shown, for example, in FIGS. 2 and 3.

Left wing 44 is sized and shaped to fit into left wing-receiving slot 66 as shown in FIGS. 1 and 2. Left pivot posts 54, 56 are sized, shaped, and located to slide into the two post-receiving slots 68, 70 formed in left side wall 24 during insertion of left wing 44 on shield 18 into left wing-receiving slot 66 in left side wall 24. Right wing 46 is sized and shaped to fit into right wing-receiving slot 72 as shown in FIGS. 1-3. Right pivot posts 58, 60 are sized, shaped, and located to slide onto the two post-receiving slots 74, 76 formed in right side wall 26 during insertion of right wing 66 into right wing-receiving slot 72 in right side wall 26.

Left arm rest 34 is positioned to lie in spaced-apart relation to underlying left shield support 32 as shown in FIG. 2 to define left wing-receiving slot 66 therebetween. Left shield support 32 includes an upwardly facing left edge wall 78 formed to include lower left post-receiving slot 68 therein. A U-shaped side wall 80 and a solid floor 82 are formed in upwardly facing left edge wall 78 as shown, for example, in FIG. 4 to define the boundary of lower left post-receiving slot 68 and provide slot 68 with an open mouth at an outer end thereof. In the illustrated embodiment, left shield support 32 includes an exterior wall having a continuous surface formed to include a first depression 80, 82 defining lower left post-receiving slot 68. Left arm rest 34 includes a downwardly facing left edge wall 84 formed to include upper left post-receiving slot 70 therein. A U-shaped side wall 86 and a solid ceiling 88 are formed in downwardly facing left edge wall 84 as shown, for example, in FIGS. 2 and 5 to define the boundary of upper left post-receiving slot 70 and provide slot 70 with an open mouth at an outer end thereof. In the illustrated embodiment, left arm rest 34 includes an exterior wall having a continuous surface formed to include a second depression 86, 88 defining upper left post-receiving slot 70. The portions 80, 82 and 86, 88 of left side wall 24 that cooperate to define the first and second depressions receiving pivot posts 54, 56 therein have positions that are fixed relative to seat bottom 28 and other portions of seating unit 16 as shown in FIGS. 2 and 3.

Right arm rest 40 is positioned to lie in spaced-apart relation to underlying right shield support 38 as shown in FIG. 2 to define right wing-receiving slot 72 therebetween. Right shield support 38 includes an upwardly facing right edge wall 90 formed to include lower right post-receiving slot 74 therein. A U-shaped side wall 92 and a solid floor 94 are formed in upwardly facing right edge wall 90 as shown, for example, in FIG. 4 to define the boundary of lower right post-receiving slot 74 and provide slot 74 with an open mouth at an outer end thereof. In the illustrated embodiment, right shield support 38 includes an exterior wall having a continuous surface formed to include a first depression 92, 94 defining lower right post-receiving slot 74. Right arm rest 40 includes a downwardly facing right edge wall 95 formed to include upper right post-receiving slot 76 therein. A U-shaped side Wall 96 and solid ceiling 98 are formed in downwardly facing right edge wall 95 as shown, for example, in FIGS. 2 and 5, to define the boundary of upper right post-receiving slot 76 and provide slot 76 with an open mouth at the outer end thereof. In the illustrated embodiment, right arm rest 40 includes an exterior wall having a continuous surface formed to include a second depression 96, 98 defining upper right post-receiving slot 76. The portions 92, 94 and 96, 98 of right side wall 26 that cooperate to define the first and second depressions receiving pivot posts 58, 60 therein have positions that are fixed relative to seat bottom 28 and other portions of seating unit 16 as shown in FIGS. 2 and 3.

Movable shield 18 is easily installed on seating unit 16 in the manner shown in FIGS. 2 and 3. Left wing 44 on shield 18 is inserted into the matching left wing-receiving slot 66 formed in left side wall 24 at the same time that right wing on shield 18 is inserted into the matching right wing-receiving slot 72 formed in right side wall 26. At about the same time, lower left pivot post 54 is inserted into the lower left post-receiving slot 68 formed in left shield support 32, upper left pivot post 56 is inserted into the upper left post-receiving slot 70 formed in left arm rest 34, lower right pivot post 58 is inserted into the lower right post-receiving slot 74 formed in right shield support 38, and upper right pivot post 60 is inserted into the upper right post-receiving slot 76 formed in right arm rest 40. By having the hinging pins (pivot posts) 54, 56, 58, 60 on the shield 18, it gives a wider contact point which increases the stability and reduces the susceptibility to torsional loading.

As shown in FIGS. 1 and 2, the slots formed in left and right side walls 24, 26 are set at an angle relative to a horizontal plane supporting seating unit 16 to enable a user to "drop" shield 18 into engagement with seating unit 16. The angled slots function to guide the left and right wings 44, 46 on gravity-fed shield 18 toward arm rest supports 36, 42 and into engagement with a child seated in seating unit 16 as shown, for example, in FIGS. 9 and 10.

Figure 9:
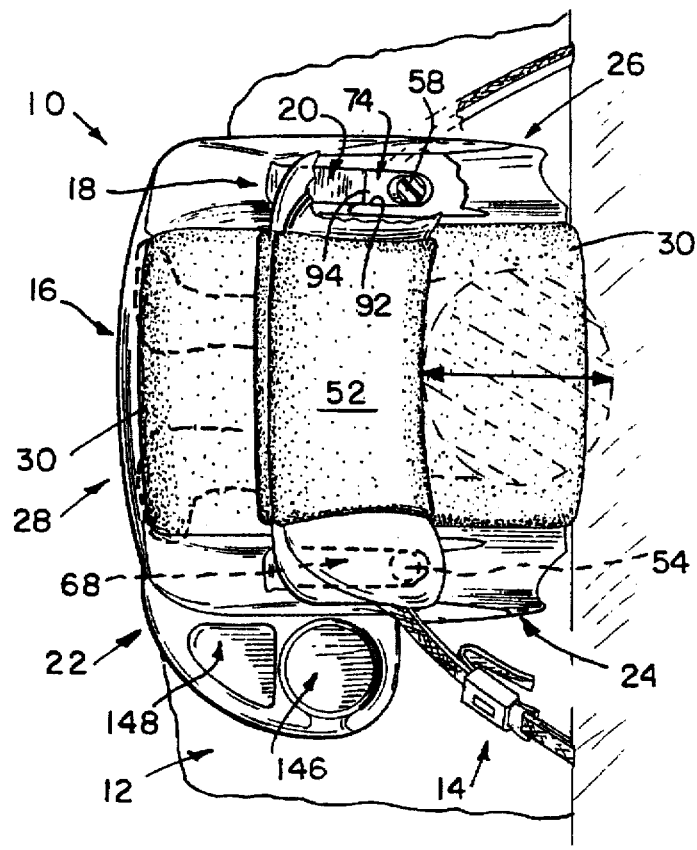
FIG. 9 is a plan view of the booster seat of FIG. 1 on a vehicle seat showing a "close-in" position of the shield to retain a smaller child in a seated position in the booster seat, the shape of the movable shield has been changed (i.e., reduced) somewhat from the shape shown in other drawing figures for illustrative purposes only.
Figure 10:
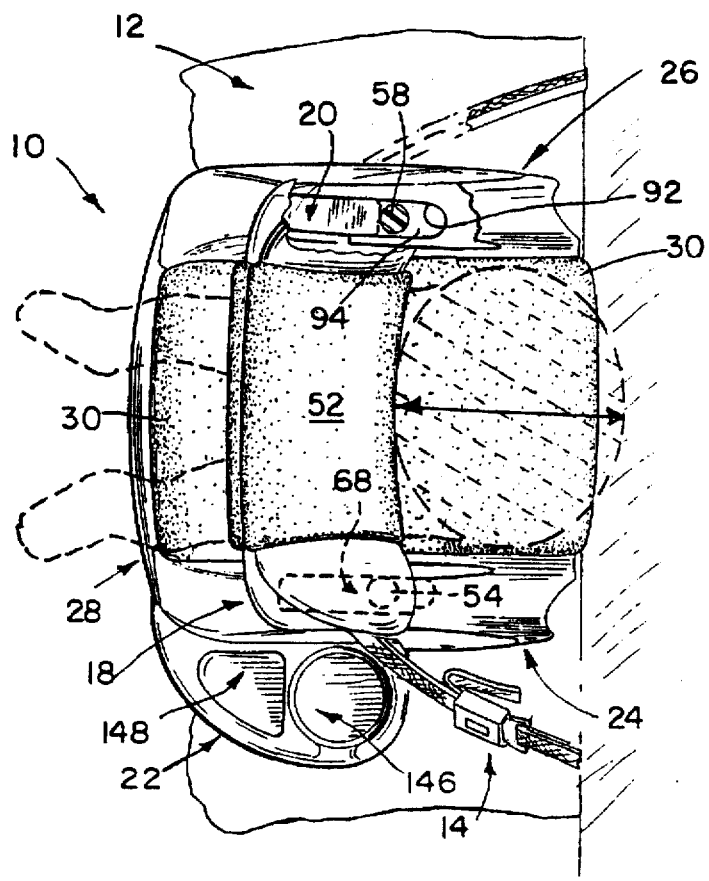
FIG. 10 is a view similar to FIG. 9 showing a "far-out" position of the shield to retain a larger child in a seated position in the booster seat, the shape of the movable shield has been changed (i.e., reduced) somewhat from the shape shown in other drawing figures for illustrative purposes only.

Once installed in seating unit 16, movable shield 18 is slidable and reciprocable relative to seating unit 16 along axis 99 shown in FIG. 11 between, for example, a "close-in" position shown in FIG. 9 and a "far-out" position shown in FIG. 10. Thus, children of various sizes and shapes are accommodated easily in booster seat 12 because of movable shield 18. The weight of shield 18 applies a force urging shield 18 in direction 97 along axis 99 as shown in FIG. 11 to cause the shield 18 to move automatically to engage snugly the abdomen of any small or large child seated in booster set 10 as shown, for example, in FIGS. 9 and 10. Also, vehicle lap belt 14, when tightened, acts to supplement the shield weight force just described and apply a second force urging shield 18 in direction 97 along axis 99. Such forces, when applied to movable shield 18, assist in maintaining shield 18 in snug engagement against the abdomen of a child seated in booster seat 10 so as to assist in retaining the child in booster seat 10 during vehicle impact.

Figure 8:
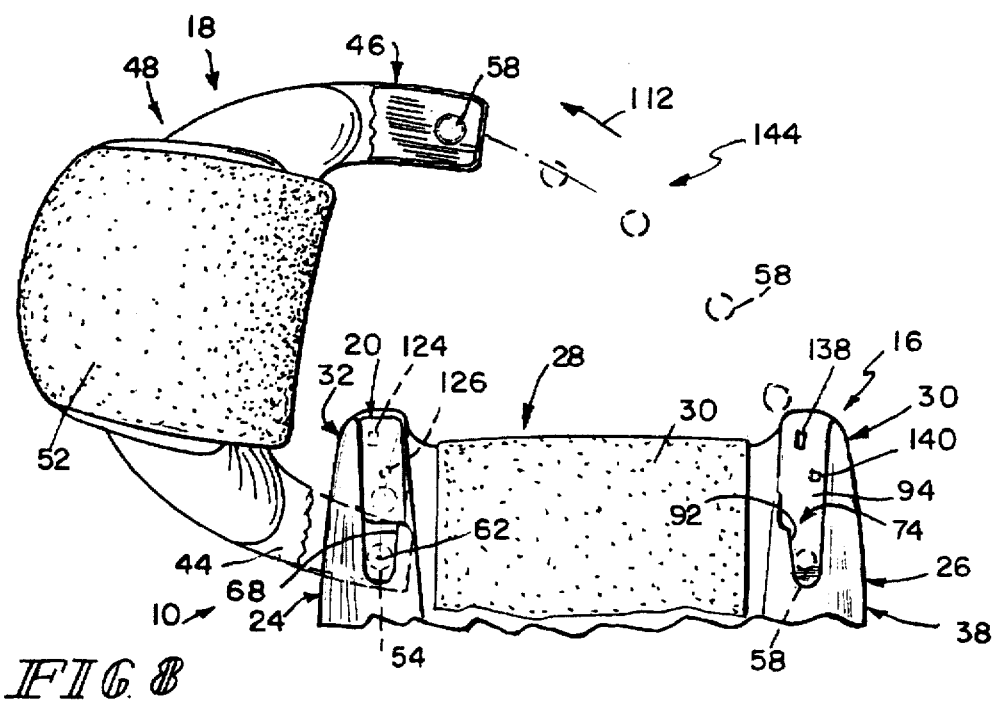

Booster seat 10 can be set up easily by a user to allow shield 18 to be pivoted relative to seating unit 16 in either a clockwise direction 110 as shown in FIG. 7 or a counter-clockwise direction 112 as shown in FIG. 8. This feature makes it easy for a user to facilitate left-side access to seating unit 16 as shown in FIG. 7 and right-side access to seating unit 16 as shown in FIG. 8.

As shown in FIG. 7, by mounting shield lock plate 20 in a predetermined position on right shield support 38, lower right pivot post 58 on shield 18 is trapped in lower right post-receiving slot 74 formed in right shield support 38 so that shield 18 is constrained to pivot about right pivot axis 64 defined by the pair of right pivot posts 58, 60 on right wing 46 in clockwise direction 110. During such clockwise pivoting movement of shield 18 relative to seating unit 16, lower left pivot post 54 on left wing 44 exits lower left post-receiving slot 68 and follows a curved path 114 shown in phantom in FIG. 7. At the same time, upper left pivot post 56 exits upper left post-receiving slot 70 and follows a similar curved path (not shown).

As shown in FIG. 8, by mounting shield lock plate 20 in a predetermined position on left shield support 32, lower left pivot post 54 on shield 18 is trapped in lower left post-receiving slot 68 formed in left shield support 32 so that shield 18 is constrained to pivot about left pivot axis 62 defined by the pair of left pivot posts 54, 56 on left wing 44 in counterclockwise direction 112. During such counter-clockwise pivoting movement of shield 18 relative to seating unit 16, lower right pivot post 58 on right wing 46 exits lower right post-receiving slot 74 and follows a curved path 116 shown in phantom in FIG. 8. At the same time, upper right pivot post 60 exits upper right post-receiving slot 76 and follows a similar curved path (not shown).

Concerning shield lock plate 20, this particular part is illustratively mounted in one of the lower post-receiving slots 68, 74. Shield lock plate 20 could also be used in each of the upper post-receiving slots 70, 76 or used in each of the upper and lower post-receiving slots of a selected side of the seat for added security.

An embodiment of shield lock plate 20 is shown in FIGS. 6a and 6b. Shield lock plate 20 includes a shell 120 having a top wall 122 and a pair of mounting posts 124, 126 depending from top wall 122. Shield lock plate 20 also includes an endless rim 128 appended to top wall 122 as shown, for example, in FIG. 6b and arranged to define an interior region 130 lying inside shell 120 and receiving the two mounting posts 124, 126 therein. Endless rim 128 includes a perimeter edge 132 configured to engage either left side wall 24 or right side wall 26 upon mounting shield lock plate 20 in a selected position on seating unit 16.

First mounting post 124 includes two adjacent snap-connector fingers 121, 123 and second mounting post 126 includes two adjacent snap-connector fingers 125, 127 as shown in FIG. 6b. Each of fingers 121, 123, 125, and 127 includes a leg 129 having one end appended to top wall 122 and another end carrying a wall-engaging foot 131. Each snap-connector finger 121, 123, 125, and 127 is made of a resilient material and is deflected somewhat during mounting of shield lock plate 20 on either left or right side walls 24, 26.

Snap-connector fingers 121, 123 of first mounting post 124 are shaped to fit into a rectangular aperture such as the first aperture 134 formed in floor 82 on left side wall 24 and the first aperture 138 formed in floor 94 on right side wall 26. Snap-connector fingers 125, 127 of second mounting post 126 are shaped to fit into a square aperture (not shown) and into a circular aperture such as the second aperture 136 formed in floor 82 on left side wall 24 and the second aperture 140 formed in floor 94 on right side wall 26. As shown in FIG. 6b, snap-connector fingers 121, 123 cooperate to define a first mounting post 124 having a first cross-sectional shape and snap-connector fingers 125, 127 cooperate to define a second mounting post 126 having a second cross-sectional shape.

As shown in FIG. 7, solid floor 82 on left shield support 32 is formed to include a first aperture 134 for receiving first mounting post 124 of shield lock plate 20 and a second aperture 136 for receiving second mounting post 126 of shield lock plate 20 when shield lock plate 20 is mounted on left side wall 24 (as shown in FIG. 8). As shown in FIG. 8, solid floor 94 on right shield support 38 is formed to include a first aperture 138 for receiving first mounting post 124 of shield lock plate 20 and a second aperture 140 for receiving second mounting post 126 of shield lock plate 20 when shield lock plate 20 is mounted on right side wall 26 (as shown in FIG. 7). First and second apertures 134, 136 are arranged in a diagonal pattern relative to one another on solid floor 82 as shown in FIG. 7 and first and second apertures 138, 140 are arranged in the same diagonal pattern relative to one another on solid floor 94 as the first and second apertures 134, 136 on solid floor 82 so that shield lock plate 28 is mounted in a predetermined orientation when coupled to left side wall 24 and in a similar orientation when coupled to right side wall 26.

Shield lock plate 20 can be mounted on right side wall 26 as shown in FIG. 7 to block lower right pivot post 58 on right wing 46 of movable shield 18 from exiting lower right post-receiving slot 76 formed in right shield support 38. Thus, shield lock plate 20 functions to trap pivot post 58 in slot 76 so as to constrain and limit movement of right wing 46 relative to seating unit 16, thereby creating means for mounting shield 18 on seating unit 16 for pivotable movement about right pivot axis 64 from a closed position shown in FIG. 1 to an opened position shown in FIG. 7 (and in phantom in FIG. 1) to provide left-side access to booster seat 10 through opening 142 (FIG. 7). Even though pivot post 58 is "trapped" as shown in FIG. 7, shield 18 is still slidable and reciprocable relative to seating unit 16 in the manner shown, for example, in FIGS. 9 and 10 to accommodate children of different sizes in booster seat 10. This is true because all four pivot posts 54, 56, 58, and 60 are still free to slide in and out in post-receiving slots 68, 70, 74, and 76 when shield 18 is moved to its closed position shown in FIG. 1 even when shield lock plate 20 is mounted on right side wall 26.

Shield lock plate 20 can alternatively be mounted on left side wall 24 as shown in FIG. 8 to block lower left pivot post 54 from exiting lower left post-receiving slot 68 formed in left shield support 32. Thus, shield lock plate 20 functions to trap pivot post 54 in slot 68 so as to constrain movement of left wing 44 relative to seating unit 16, thereby creating means for mounting shield 18 on seating unit 16 for pivotable movement about left pivot axis 62 from the closed position shown in FIG. 1 to an opened position shown in FIG. 8 to provide right-side access to booster seat 10 through opening 144 (FIG. 8). Even though pivot post 54 is "trapped" as shown in FIG. 8, shield 18 is still slidable and reciprocable relative to seating unit 16 in the manner shown, for example, in FIGS. 9 and 10 to accommodate children of different sizes in booster seat 10. As noted previously, this is true because all four pivot posts 54, 56, 58, and 60 are still free to slide in and out in post-receiving slots 68, 70, 74, and 76 when shield 18 is moved to its closed position shown in FIG. 1 even when shield lock plate 20 is mounted on left side wall 24.

Vehicle seat 12 can be used as a belt-positioning booster car seat to seat a child without using movable shield 18. In this case, the wing-receiving and post-receiving slots 66, 68, 70, 72, 74, 76 need to be clear of any intrusions into this space for the auto lap-shoulder belt to properly and snugly engage the child occupant in a secure manner.

Cupholder 22 is mounted along left side wall 24 as shown in FIGS. 1 and 11–13 to provide a convenient place to hold cups or other articles (not shown) within reach of a child seated in booster seat 10. Cupholder 22 includes one or more receptacles such as cup-receiving cavity 146 and article-receiving cavity 148. These cavities 146, 148 are formed in cup-receiving portion 150 of cupholder 22. Cupholder 22 also includes a mounting portion 152 appended to cup-receiving portion 150 and configured to mount to one of the side walls 24, 16. Fasteners 154 are provided for coupling mounting portion 152 of cupholder 22 to fixtures 156 appended to one of left side wall 24 or right side wall 26. It is within the scope of this disclosure to adjust the shape of cupholder 22 and the location of mounting fixtures 56 to allow cupholder 22 to be mounted to booster seat 10 alongside right side wall 26.

Although the invention has been described in detail with reference to certain preferred embodiments, variations and modifications exist within the scope and spirit of the invention as described and defined in the following claims.

I claim:

1. A booster seat comprising a seat including a left side wall, a right side wall positioned to lie in spaced-apart relation to the left side wall, and a seat bottom therebetween, the left side wall being formed to include a left wing-receiving slot and a left pair of opposing, spaced-apart, post-receiving slots, the right side wall being formed to include a right wing-receiving slot and a right pair of opposing, spaced-apart, post-receiving slots, a movable shield including a left wing positioned to lie in the left wing-receiving slot, a right wing positioned to lie in the right wing-receiving slot, and a barrier positioned to lie between the left and right wings and above the seat bottom, the movable shield further including a pair of left pivot posts appended to the left wing and arranged to engage the left pair of opposing, spaced-apart, post-receiving slots, and a pair of right pivot posts appended to the right wing and arranged to engage the right pair of opposing, spaced-apart, post-receiving slots, and means for selectively trapping one of the pivot posts in a selected post-receiving slot so that said one of the pair of left and right pivot posts cooperate to define a pivot axis extending therethrough during pivoting movement of the movable shield relative to the seat about the pivot axis from a closed position overlying the seat bottom to an opened position away from the seat bottom, the trapping means including a shield lock plate having a mount portion coupled to the seat and a pivot post blocker portion located in one of the post-receiving slots formed in the side walls.

2. The booster seat of claim 1, wherein the left side wall includes a left shield support appended to the seat bottom, a left arm rest, and an arm rest support interconnecting the left shield support and the left arm rest to position the left arm rest in spaced-apart relation to the left shield support, the left shield support includes an exterior wall configured to define one of the left pair of opposing, spaced-apart, post-receiving slots therein in a fixed position relative to the seat bottom, and the left arm rest includes an exterior wall configured to define another of the left pair of opposing, spaced-apart, post-receiving slots therein in a fixed position relative to the seat bottom and opposite to said one of the left pair of opposing, spaced-apart, post-receiving slots formed in the left shield support.

3. The booster seat of claim 2, wherein each exterior wall includes a continuous surface formed to include a first depression defining said one of the left pair of opposing, spaced-apart, post-receiving slots and a second depression defining said another of the left pair of opposing, spaced-apart, post-receiving slots.

4. The booster seat of claim 2, wherein the movable shield has a one-piece body including the left wing, the left pivot posts on the left wing, the right wing, the right pivot posts on the right wing, and the barrier between the left and right wings.

5. The booster seat of claim 2, wherein the left shield support and left arm rest are each formed to include an open mouth at an outer end of each of the left pair of opposing, spaced-apart, post-receiving slots to permit movement of the left pivot posts into and out of the left pair of opposing, spaced-apart, post-receiving slots during insertion of the left wing into the left wing-receiving slot.

6. The booster seat of claim 2, wherein the right side wall includes a right shield support appended to the seat bottom, a right arm rest, and an arm rest support interconnecting the right shield support and the right arm rest to position the right arm rest in spaced-apart relation to the right shield support, the right shield support includes an exterior wall configured to define one of the right pair of opposing, spaced-apart, post-receiving slots therein in a fixed position relative to the barrier, and the right arm rest includes an exterior wall configured to define another of the right pair of opposing, spaced-apart, post-receiving slots therein in a fixed position relative to the barrier and opposite to said one of the right pair of opposing, spaced-apart, post-receiving slots formed in the right shield support.

7. The booster seat of claim 6, wherein the right shield support and right arm rest are each formed to include an open mouth at an outer end of each of the right pair of opposing, spaced-apart, post-receiving slots to permit movement of the right pivot posts into and out of the right pair of opposing, spaced-apart, post-receiving slots during insertion of the right wing into the right wing-receiving slot.

8. The booster seat of claim 1, wherein one of the left pivot posts extends away from the left wing along a left axis in a first direction and another of the left pivot posts extends away from the left wing along the left axis in a second direction opposite to the first direction.

9. The booster seat of claim 8, wherein one of the right pivot posts extends away from the right wing along a right axis aligned in spaced-apart parallel relation to the left axis in a third direction parallel to the first direction and another of the right pivot posts extends away from the right wing along the right axis in a fourth direction opposite to the third direction.

10. The booster seat of claim 1, further comprising a cup holder and means for mounting the cup holder to the seat alongside one of the left and right side walls.

11. The booster seat of claim 10, wherein the cup holder is formed to include a first cavity configured to receive a cup therein and a second cavity configured to receive articles therein.

12. A booster seat comprising a seat including a left side wall, a right side wall positioned to lie in spaced-apart relation to the left side wall, and a seat bottom therebetween, the left side wall being formed to include a left wing-receiving slot and a left pair of opposing, spaced-apart, post-receiving slots, the right side wall being formed to include a right wing-receiving slot and a right pair of opposing, spaced-apart, post-receiving slots, a movable shield including a left wing positioned to lie in the left wing-receiving slot, a right wing positioned to lie in the right wing-receiving slot, and a barrier positioned to lie between the left and right wings and above the seat bottom, the movable shield further including a pair of left pivot posts appended to the left wing and arranged to engage the left pair of opposing, spaced-apart, post-receiving slots and a pair of right pivot posts appended to the right wing and arranged to engage the right pair of opposing, spaced-apart, post-receiving slots, and means for selectively trapping one of the pivot posts in a selected post-receiving slot so that said one of the pair of left and right pivot posts cooperate to define a pivot axis extending therethrough during pivoting movement of the movable shield relative to the seat about the pivot axis from a closed position overlying the seat bottom to an opened position away from the seat bottom, the trapping means including a shield lock plate, the left side wall including first mounting means for mounting the shield lock plate in a position adjacent to one of the post-receiving slots included in the left pair of opposing, spaced-apart, post-receiving slots to block removal of a pivot post therefrom, and the right side wall including second mounting means for mounting the shield lock plate in a position adjacent to one of the post-receiving slots included in the right pair of opposing, spaced-apart, post-receiving slots to block removal of a pivot post therefrom.

13. A booster seat comprising a seat including a left side wall, a right side wall positioned to lie in spaced-apart relation to the left side wall, and a seat bottom therebetween, the left side wall being formed to include a left wing-receiving slot and a left pair of opposing, spaced-apart, post-receiving slots, the right side wall being formed to include a right wing-receiving slot and a right pair of opposing, spaced-apart, post-receiving slots, the left side wall including a first U-shaped wall defining a first of the left pair of post-receiving slots and a second U-shaped wall defining a second of the left pair of post-receiving slots, the right side wall including a third U-shaped wall defining a first of the right pair of post-receiving slots and a fourth U-shaped wall defining a second of the right pair of post-receiving slots, each of the U-shaped walls being formed to include an open mouth at one end thereof defining a pivot post-receiving entrance opening into the post-receiving slot defined therein, a movable shield including a left wing positioned to lie in the left wing-receiving slot, a right wing positioned to lie in the right wing-receiving slot, and a barrier positioned to lie between the left and right wings and above the seat bottom, the movable shield further including a pair of left pivot posts appended to the left wing and arranged to engage the left pair of opposing, spaced-apart, post-receiving slots and a pair of right pivot posts appended to the right wing and arranged to engage the right pair of opposing, spaced-apart, post-receiving slots, and means for selectively trapping one of the pivot posts in a selected post-receiving slot so that said one of the pair of left and right pivot posts cooperate to define a pivot axis extending therethrough during pivoting movement of the movable shield relative to the seat about the pivot axis from a closed position overlying the seat bottom to an opened position away from the seat bottom, the trapping means including a shield lock plate and means for retaining the shield lock plate on a selected one of the left and right side walls in a position closing the open mouth formed in one of the U-shaped walls so that a pivot post received in the post-receiving slot defined in said one of the U-shaped walls is blocked from exiting said post-receiving slot through a pivot post-receiving entrance opening associated with said post-receiving slot without blocking reciprocating movement of said pivot post in said post-receiving slot along a longitudinal axis extending along the length of said post-receiving slot and pivoting movement of said pivot post in said pivot-receiving slot about said pivot axis.

14. A booster seat comprising a seat including a left side wall, a right side wall positioned to lie in spaced-apart relation to the left side wall, and a seat bottom therebetween, the left side wall being formed to include a left wing-receiving slot and a left pair of opposing, spaced-apart, post-receiving slots, the right side wall being formed to include a right wing-receiving slot and a right pair of opposing, spaced-apart, post-receiving slots, the seat being formed to include a fixed-position slot bottom wall appended to one of the side walls and a fixed-position slot side wall appended to said fixed-position slot bottom wall defining each of the post-receiving slots and defining a pivot post-receiving entrance opening associated with each post-receiving slot, a movable shield including a left wing positioned to lie in the left wing-receiving slot, a right wing positioned to lie in the right wing-receiving slot, and a barrier positioned to lie between the left and right wings and above the seat bottom, the movable shield further including a pair of left pivot posts appended to the left wing and arranged to engage the left pair of opposing, spaced-apart, post-receiving slots and a pair of right pivot posts appended to the right wing and arranged to engage the right pair of opposing, spaced-apart, post-receiving slots, means for selectively trapping one of the pivot posts in a selected post-receiving slot so that said one of the pair of left and right pivot posts cooperate to define a pivot axis extending therethrough during pivoting movement of the movable shield relative to the seat about the pivot axis from a closed position overlying the seat bottom to an opened position away from the seat bottom, the trapping means being mounted on the seat to block one of the pivot posts from exiting its companion post-receiving slot through said pivot post-receiving entrance opening during pivoting movement of the movable shield relative to the seat.

15. A booster seat comprising a seat including a left side wall, a right side wall positioned to lie in spaced-apart relation to the left side wall, and a seat bottom therebetween, the left side wall being formed to include a left wing-receiving slot and a left pair of opposing, spaced-apart, post-receiving slots, the right side wall being formed to include a right wing-receiving slot and a right pair of opposing, spaced-apart, post-receiving slots, the left side wall including a left shield support appended to the seat bottom, a left arm rest, and an arm rest support interconnecting the left shield support and the left arm rest to position the left arm rest in spaced-apart relation to the left shield support, the left shield support including an exterior wall configured to define one of the left pair of opposing, spaced-apart, post-receiving slots therein in a fixed position relative to the seat bottom, and the left arm rest including an exterior wall configured to define another of the left pair of opposing, spaced-apart, post-receiving slots therein in a fixed position relative to the seat bottom and opposite to said one of the left pair of opposing, spaced-apart, post-receiving slots formed in the left shield support, the left shield support and left arm rest each being formed to include an open mouth at an outer end of each of the left pair of opposing, spaced-apart, post-receiving slots to permit movement of the left pivot posts into and out of the left pair of opposing, spaced-apart, post-receiving slots during insertion of the left wing into the left wing-receiving slot, a movable shield including a left wing positioned to lie in the left wing-receiving slot, a right wing positioned to lie in the right wing-receiving slot, and a barrier positioned to lie between the left and right wings and above the seat bottom, the movable shield further including a pair of left pivot posts appended to the left wing and arranged to engage the left pair of opposing, spaced-apart, post-receiving slots and a pair of right pivot posts appended to the right wing and arranged to engage the right pair of opposing, spaced-apart, post-receiving slots, and a removable shield lock plate coupled to the left shield support to block withdrawal of the left pivot post from said one of the left pair of opposing, spaced-apart, post-receiving slots formed in the left shield support and permit pivotable movement of the movable shield relative to the seat about a pivot axis defined by the left pivot post in said one of the left pair of opposing, spaced-apart, post-receiving slots formed in the left shield support.

16. A booster seat comprising a seat including a left side wall, a right side wall positioned to lie in spaced-apart relation to the left side wall, and a seat bottom therebetween, the left side wall being formed to include a left wing-receiving slot and a left pair of opposing, spaced-apart, post-receiving slots, the right side wall being formed to include a right wing-receiving slot and a right pair of opposing, spaced-apart, post-receiving slots, the left side wall including a left shield support appended to the seat bottom, a left arm rest, and an arm rest support interconnecting the left shield support and the left arm rest to position the left arm rest in spaced-apart relation to the left shield support, the left shield support including an exterior wall configured, to define one of the left pair of opposing, spaced-apart, post-receiving slots therein in a fixed position relative to the seat bottom, and the left arm rest including an exterior wall configured to define another of the left pair of opposing, spaced-apart, post-receiving slots therein in a fixed position relative to the seat bottom and opposite to said one of the left pair of opposing, spaced-apart, post-receiving slots formed in the left shield support, the right side wall including a right shield support appended to the seat bottom, a right arm rest, and an arm rest support interconnecting the right shield support and the right arm rest to position the right arm rest in spaced-apart relation to the right shield support, the right shield support including an exterior wall configured to define one of the right pair of opposing, spaced-apart, post-receiving slots therein in a fixed position relative to the barrier, and the right arm rest including an exterior wall configured to define another of the right pair of opposing, spaced-apart, post-receiving slots therein in a fixed position relative to the barrier and opposite to said one of the right pair of opposing, spaced-apart, post-receiving slots formed in the right shield support, the right shield support and right arm rest each being formed to include an open mouth at an outer end of each of the right pair of opposing, spaced-apart, post-receiving slots to permit movement of the right pivot posts into and out of the right pair of opposing, spaced-apart, post-receiving slots during insertion of the right wing into the right wing-receiving slot, a movable shield including a left wing positioned to lie in the left wing-receiving slot, a right wing positioned to lie in the right wing-receiving slot, and a barrier positioned to lie between the left and right wings and above the seat bottom, the movable shield further including a pair of left pivot posts appended to the left wing and arranged to engage the left pair of opposing, spaced-apart, post-receiving slots and a pair of right pivot posts appended to the right wing and arranged to engage the right pair of opposing, spaced-apart, post-receiving slots, and a removable shield lock plate coupled to one of the left shield support to block withdrawal of the left pivot post from said one of the left pair of opposing, spaced-apart, post-receiving slots formed in the left shield support and permit pivotable movement of the movable shield relative to the seat about a left-side pivot axis defined by the left pivot post in said one of the left pair of opposing, spaced-apart, post-receiving slots formed in the left shield support and the right shield support to block withdrawal of the right pivot post from said one of the right pair of opposing, spaced-apart, post-receiving slots formed in the right shield support and permit pivotable movement of the movable shield relative to the seat about a right-side pivot axis defined by the right pivot post in said one of the right pair of opposing, spaced-apart, post-receiving slots formed in the right shield support.

17. The booster seat of claim 16, wherein the movable shield has a one-piece body including the left wing, the left pivot posts on the left wing, the right wing, the right pivot posts on the right wing, and the barrier between the left and right wings.

18. A booster seat comprising a seat including a left side wall, a right side wall positioned to lie in spaced-apart relation to the left side wall, and a seat bottom therebetween, the left side wall being formed to include a left wing-receiving slot and a left pair of opposing, spaced-apart, post-receiving slots, the right side wall being formed to include a right wing-receiving slot and a right pair of opposing, spaced-apart, post-receiving slots, a movable shield including a left wing positioned to lie in the left wing-receiving slot, a right wing positioned to lie in the right wing-receiving slot, and a barrier positioned to lie between the left and right wings and above the seat bottom, the movable shield further including a pair of left pivot posts appended to the left wing and arranged to engage the left pair of opposing, spaced-apart, post-receiving slots and a pair of right pivot posts appended to the right wing and arranged to engage the right pair of opposing, spaced-apart, post-receiving slots, one of the left pivot posts extending away from the left wing along a left axis in a first direction and another of the left pivot posts extending away from the left wing along the left axis in a second direction opposite to the first direction, and a shield lock plate selectively coupled to one of the left and right side walls to block removal of a selected pivot post from one of the post-receiving slots formed in said one of the left and right side walls to allow pivotable movement of the movable shield relative to the seat about a pivot axis extending through said selected pivot post yet block movement of said selected pivot post out of said one of the post-receiving slots.

19. The booster seat of claim 18, wherein each of the left pivot posts is integrally appended to the left wing and each of the right pivot posts is integrally appended to the right wing.

20. A booster seat comprising a seat including a left side wall, a right side wall positioned to lie in spaced-apart relation to the left side wall, and a seat bottom therebetween, the left side wall being formed to include a first left edge wall and a second left edge wall positioned to lie in spaced-apart relation to the first left edge wall to define a left wing-receiving slot therebetween, the first left edge wall being formed to include an elongated left lower post-receiving slot having an open mouth at one end thereof, the second left edge wall being formed to include an elongated left upper post-receiving slot having an open mouth at one end thereof, the right side wall being formed to include a first right edge wall and a second right edge wall positioned to lie in spaced-apart relation to the first right edge wall to define a right wing-receiving slot therebetween, the first right edge wall being formed to include an elongated right lower post-receiving slot having an open mouth at one end thereof, the second right edge wall being formed to include an elongated upper post-receiving slot having an open mouth at one end thereof, a movable shield including a left wing positioned to lie in the left wing-receiving slot, a right wing positioned to lie in the right wing-receiving slot, and a barrier positioned to lie between the left and right wings and above the seat bottom upon movement of the movable shield relative to the seat to a closed position, the left wing including a lower pivot post in the left lower post-receiving slot and an upper pivot post in the left upper post-receiving slot, the right wing including a lower pivot post in the right lower post-receiving slot and an upper pivot post in the right upper post-receiving slot, and a shield lock plate selectively coupled to one of the left and right side walls to block removal of a selected pivot post from one of the post-receiving slots formed in said one of the left and right side walls to allow pivotable movement of the movable shield relative to the seat about a pivot axis extending through said selected pivot post yet block movement of said selected pivot post out of said one of the post-receiving slots.

21. A booster seat comprising a seat including a left side wall, a right side wall positioned to lie in spaced-apart relation to the left side wall, and a seat bottom therebetween, the left side wall being formed to include a first left edge wall and a second left edge wall positioned to lie in spaced-apart relation to the first left edge wall to define a left wing-receiving slot therebetween, the first left edge wall being formed to include an elongated left lower post-receiving slot having an open mouth at one end thereof, the second left edge wall being formed to include an elongated left upper post-receiving slot having an open mouth at one end thereof, the right side wall being formed to include a first right edge wall and a second right edge wall positioned to lie in spaced-apart relation to the first right edge wall to define a right wing-receiving slot therebetween, the first right edge wall being formed to include an elongated right lower post-receiving slot having an open mouth at one end thereof, the second right edge wall being formed to include an elongated upper post-receiving slot having an open mouth at one end thereof, a movable shield including a left wing positioned to lie in the left wing-receiving slot, a right wing positioned to lie in the right wing-receiving slot, and a barrier positioned to lie between the left and right wings and above the seat bottom upon movement of the movable shield relative to the seat to a closed position, the left wing including a lower pivot post in the left lower post-receiving slot and an upper pivot post in the left upper post-receiving slot, the right wing including a lower pivot post in the right lower post-receiving slot and an upper pivot post in the right upper post-receiving slot, and a shield lock plate selectively coupled to one of the left and right side walls to block removal of a selected pivot post from one of the post-receiving slots formed in said one of the left and right side walls to allow pivotable movement of the movable shield relative to the seat about a pivot axis extending through said selected pivot post yet block movement of said selected pivot post out of said one of the post-receiving slots, the shield lock plate including a shell having a top wall and a pair of mounting posts depending from the top wall, the first left edge wall being formed to include first aperture means for selectively receiving the pair of mounting posts therein to establish a fixed position of the shield lock plate on the first left edge wall closing the open mouth of the left lower post-receiving slot, and the first right edge wall being formed to include second aperture means for selectively receiving the pair of mounting posts therein to establish a fixed position of the shield lock plate on the first right edge wall closing the open mouth of the right lower post-receiving slot.

22. The booster seat of claim 21, wherein a first of the pair of mounting posts has a first cross-sectional shape, a second of the pair of mounting posts has a second cross-sectional shape that is different from the first cross-sectional shape, the first aperture means is configured to define a first hole in the first left edge wall matching the first cross-sectional shape and a second hole in the first left edge wall matching the second cross-sectional shape, and the second aperture means is configured to define a first hole in the first right edge wall matching the first cross-sectional shape and a second hole in the first right edge wall matching the second cross-sectional shape.

23. The booster seat of claim 22, wherein the first cross-sectional shape is rectangular and the second cross-sectional shape is circular.

24. The booster seat of claim 20, wherein the first left edge wall includes a continuous surface formed to include a first depression defining the elongated left lower post-receiving slot therein, the second left edge wall is formed to include a second depression defining the elongated left upper post-receiving slot therein, the first right edge wall includes a continuous surface formed to include a third depression defining the elongated right lower post-receiving slot therein, and the second right edge wall is formed to include a fourth depression defining the elongated right upper post-receiving slot therein.

25. The booster seat of claim 24, wherein the movable shield has a one-piece body including the left wing, the left pivot posts on the left wing, the right wing, the right pivot posts on the right wing, and the barrier between the left and right wings.

26. The booster seat of claim 20, wherein the left wing includes a left shield support appended to the seat bottom, a left arm rest, and an arm rest support interconnecting the left shield support and the left arm rest to position the left arm rest in spaced-apart relation to the left shield support, the left shield support includes the first left edge wall, and the left arm rest includes the second left edge wall.

27. The booster seat of claim 26, wherein the right wing includes a right shield support appended to the seat bottom, a right arm rest, and an arm rest support interconnecting the right shield Support and the right arm rest to position the right arm rest in spaced-apart relation to the right shield support, the right shield support includes the first light edge wall, and the right arm rest includes the second right edge wall.

28. The booster seat of claim 27, wherein the first left edge wall includes a continuous surface formed to include a first depression defining the elongated left lower post-receiving slot therein, the second left edge wall is formed to include a second depression defining the elongated left upper post-receiving slot therein, the first right edge wall includes a continuous surface formed to include a third depression defining the elongated right lower post-receiving slot therein, and the second right edge wall is formed to include a fourth depression defining the elongated right upper post-receiving slot therein.

29. The booster seat of claim 20, further comprising a cup holder mounted to the seat along one of the left an right side walls.

30. The booster seat of claim 29, wherein the cup holder is formed to include a first cavity configured to receive a cup therein and a second cavity configured to receive articles therein.

31. A booster seat comprising
a seat including a left side wall, a right side wall positioned to lie in spaced-apart relation to the left side wall, and a seat bottom therebetween, the left side wall being formed to include a first left edge wall and a second left edge wall positioned to lie in spaced-apart relation to the first left edge wall to define a left wing-receiving slot therebetween, the first left edge wall being formed to include a first U-shaped side wall and a first floor inside a region bounded by the first U-shaped side wall, the first U-shaped side wall and the first floor cooperating to define an elongated left lower post-receiving slot having an open mouth at one end thereof, the second left edge wall being formed to include a second U-shaped side wall and a first ceiling inside a region bounded by the second U-shaped side wall, the second U-shaped side wall and the first ceiling cooperating to define an elongated left upper post-receiving slot having an open mouth at one end thereof, the right side wall being formed to include a first right edge wall and a second right edge wall positioned to lie in spaced-apart relation to the first right edge wall to define a right wing-receiving slot therebetween, the first right edge wall being formed to include a third U-shaped side wall and a second floor inside a region bounded by the third U-shaped side wall, the third U-shaped side wall and the second floor cooperating to define an elongated right lower post-receiving slot having an open mouth at one end thereof, the second right edge wall being formed to include a fourth U-shaped side wall and a second ceiling inside a region bounded by the fourth U-shaped side wall, the fourth U-shaped side wall and the second ceiling cooperating to define an elongated upper post-receiving slot having an open mouth at one end thereof,
a movable shield including a left wing positioned to lie in the left wing-receiving slot, a right wing positioned to lie in the right wing-receiving slot, and a barrier positioned to lie between the left and right wings and above the seat bottom upon movement of the movable shield relative to the seat to a closed position, the left wing including a lower pivot post in the left lower post-receiving slot and an upper pivot post in the left upper post-receiving slot, the right wing including a lower pivot post in the right lower post-receiving slot and an upper pivot post in the right upper post-receiving slot, and
a shield lock plate selectively coupled to one of the left and right side walls to block removal of a selected pivot post from one of the post-receiving slots formed in said one of the left and right side walls to allow pivotable movement of the movable shield relative to the seat about a pivot axis extending through said selected pivot post yet block movement of said selected pivot post out of said one of the post-receiving slots.

32. The booster seat of claim 31, wherein the shield lock plate includes a shell having a top wall and a pair of mounting posts depending from the top wall, the first left edge wall is formed to include first aperture means for selectively receiving the pair of mounting posts therein to establish a fixed position of the shield lock plate on the first left edge wall closing the open mouth of the left lower post-receiving slot, and the first right edge wall is formed to include second aperture means for selectively receiving the pair of mounting posts therein to establish a fixed position of the shield lock plate on the first right edge wall closing the open mouth of the right lower post-receiving slot.

33. The booster seat of claim 32, wherein a first of the pair of mounting posts has a first cross-sectional shape, a second of the pair of mounting posts has a second cross-sectional shape that is different from the first cross-sectional shape, the first aperture means is configured to define a first hole in the first left edge wall matching the first cross-sectional shape and a second hole in the first left edge wall matching the second cross-sectional shape, and the second aperture means is configured to define a first hole in the first right edge wall matching the first cross-sectional shape and a second hole in the first right edge wall matching the second cross-sectional shape.

34. The booster seat of claim 31, wherein the movable shield has a one-piece body including the left wing, the left pivot posts on the left wing, the right wing, the right pivot posts on the right wing, and the barrier, between the left and right wings.

35. The booster seat of claim 31, wherein the left wing includes a left shield support appended to the seat bottom, a left arm rest, and an arm rest support interconnecting the left shield support and the left arm rest to position the left arm rest in spaced-apart relation to the left shield support, the left shield support includes the first left edge wall, and the left arm rest includes the second left edge wall.

36. The booster seat of claim 35, wherein the right wing includes a right shield support appended to the seat bottom, a right arm rest, and an arm rest support interconnecting the right shield support and the right arm rest to position the right arm rest in spaced-apart relation to the right shield support, the right shield support includes the first right edge wall, and the right arm rest includes the second right edge wall.

37. The booster seat of claim 31, further comprising a cup holder mounted to the seat along one of the left and right side walls.

38. The booster seat of claim 37, wherein the cup holder is formed to include a first cavity configured to receive a cup therein and a second cavity configured to receive articles therein.

39. A booster seat comprising
a movable shield including an elongated barrier, a left wing appended to one end of the elongated barrier, and a right wing appended to another end of the elongated barrier, the left wing including a first left pivot post, the right wing including a first right pivot post,
a seat including a left side wall, a right side wall positioned to lie in spaced-apart relation to the right side wall, and a seat bottom therebetween, the left side wall being formed to include a left wing-receiving slot receiving the left wing therein and a first left pivot post-receiving slot receiving the first left pivot post therein, the right side wall being formed to include a right wing-receiving slot receiving the right wing therein and a first right pivot post-receiving slot receiving the first right pivot post therein, and a shield lock plate selectively coupled to one of the left and right side walls to block removal of a selected pivot post from one of the post-receiving slots formed in said one of the left and right side walls to allow pivotable movement of the movable shield relative to the seat about a pivot axis extending through said selected pivot post yet block movement of said selected pivot post out of said one of the post-receiving slots.

40. The booster seat of claim 39, wherein the left wing includes a second left pivot post, the left side wall is formed to include a second left pivot post-receiving slot receiving the second left pivot post therein, the right wing includes a second right pivot post, and the right side wall is formed to include a second right pivot post-receiving slot receiving the second right pivot post therein.

41. A booster-seat comprising
a seat including a left side wall, a right side wall positioned to lie in spaced-apart relation to the left side wall, and a seat bottom therebetween, the left side wall being formed to include a left wing-receiving portion, the right side wall being formed to include a right wing-receiving portion,
a movable shield including a left wing coupling the left wing-receiving portion, a right wing coupling the right wing-receiving portion, and a barrier positioned to lie between the left and right wings and above the seat bottom, and
a shield lock plate including a mount portion coupled to one of the seat and moveable shield to selectively trap one of the left wing and right wing with one of the left wing-receiving portion and right wing-receiving portion, respectively wherein the left wing-receiving portion is formed to include a left wing-receiving slot and a left pair of opposing, spaced-apart, post-receiving slots, the right wing-receiving portion is formed to include a right wing-receiving slot and a right pair of opposing, spaced-apart, post-receiving slots, the moveable shield further includes a pair of left pivot posts appended to the left wing and arranged to engage the left pair of opposing, spaced-apart, post-receiving slots and a pair of right pivot posts appended to the right wing and arranged to engage the right pair of opposing, spaced-apart, post-receiving slots.

42. The booster seat of claim 41, wherein the shield lock plate further includes a pivot post blocker portion positioned to lie in one of the post-receiving slots formed in the side walls.

43. The booster seat of claim 41, wherein the shield lock plate includes a shell having a top wall and a pair of mounting posts depending from the top wall, one of the left and right side walls is formed to include a first aperture sized to receive a first of the pair of mounting posts and a second aperture sized to receive a second of the pair of mounting posts.

44. The booster seat of claim 43, wherein the first mounting post includes two snap-connector fingers, the second mounting post includes two snap-connector fingers, and each of the snap-connector fingers includes a leg having an end appended to the top wall and another end carrying a wall-engaging foot.

45. The booster of claim 43, wherein the first mounting post has a first cross-sectional shape, the second mounting post has a second cross-sectional shape that is different from the first cross-sectional shape, the first mounting post is configured to extend into the first aperture the second mounting post is configured to extend into the second aperture.

46. The booster seat of claim 41, wherein the left side wall includes a first U-shaped wall defining a first of the left pair of post-receiving slots and a second U-shaped wall defining a second of the left pair of post-receiving slots, the right side wall includes a third U-shaped wall defining a first of the right pair of post-receiving slots and a fourth U-shaped wall defining a second of the right pair of post-receiving slots, each of the U-shaped walls is formed to include an open mouth at one end thereof defining a pivot post-receiving entrance opening into the post-receiving slot defined therein, the shield lock plate includes a shell having a top wall and a pair of mounting posts depending from the top wall, and one of the left or right side walls is formed to include a first aperture sized to receive a first of the pair of mounting posts and a second aperture sized to receive a second of the pair of mounting posts.

47. The booster seat of claim 41, wherein the left wing-receiving portion includes a first left edge wall and a second left edge wall positioned to lie in spaced-apart relation to the first left edge wall to define a left wing-receiving slot therebetween, the first left edge wall is formed to include an elongated left lower post-receiving slot having an open mouth at one end thereof, the second left edge wall is formed to include an elongated left upper post-receiving slot having an open mouth at one end thereof, the right wing-receiving portion is formed to include a first right edge wall and a second right edge wall positioned to lie in spaced-apart relation to the first right edge wall to define a right wing-receiving slot therebetween, the first right edge wall is formed to include an elongated right lower post-receiving slot having an open mouth at one end thereof, and the second right edge wall is formed to include an elongated upper post-receiving slot having an open mouth at one end thereof.

48. The booster seat of claim 47, wherein the left wing is positioned to lie in the left wing-receiving slot, the right wing is positioned to lie in the right wing-receiving slot; the barrier is positioned to lie above the seat bottom upon movement of the movable shield relative to the seat to a closed position, the left wing includes a lower pivot post in the left lower post-receiving slot and an upper pivot post in the left upper post-receiving slot, the right wing includes a lower pivot post in the right lower post-receiving slot and an upper pivot post in the right upper post-receiving slot.

49. The booster seat of claim 47, wherein the shield lock plate is selectively coupled to one of the left and right side walls to block removal of a selected pivot post from one of the post-receiving slots formed in said one of the left and right side walls to allow pivotable movement of the movable shield relative to the seat about a pivot axis extending through said selected pivot post yet block movement of said selected pivot post out of said one of the post-receiving slots.

50. The booster seat of claim 49, wherein the shield lock plate includes a shell having a top wall and a pair of mounting posts depending from the top wall, one of the first left edge wall and first right edge wall is formed to include a first aperture sized to receive a first of the pair of mounting posts and a second aperture sized to receive a second of the pair of mounting posts.

51. The booster seat of claim 50, wherein the first mounting post includes two snap-connector fingers, the second mounting post includes two snap-connector fingers, and each of the snap-connector fingers includes a leg having an end appended to the top wall and another end carrying a wall-engaging foot.

52. The booster seat of claim 50, wherein the first mounting post has a first cross-sectional shape, the second mounting post has a second cross-sectional shape that is different from the first cross-sectional shape, the first mounting post extends into the first aperture and the second mounting post extends into the second aperture.

53. The booster seat of claim 52, wherein the first mounting post includes two snap-connector fingers, the second mounting post includes two snap-connector fingers, each of the snap-connector fingers includes a leg having an end appended to the top wall and another end carrying a wall-engaging foot, and the snap-connector fingers of the first mounting post are shaped to fit into the first aperature and the snap-connector fingers-of the second mounting post are shaped to fit into the second aperture.

54. The booster seat of claim 52, wherein the first cross-sectional shape is rectangular and the second cross-sectional shape is circular.

* * * * *